US009143659B2

(12) United States Patent
Shuster

(10) Patent No.: US 9,143,659 B2
(45) Date of Patent: Sep. 22, 2015

(54) CLOTHING AND BODY COVERING PATTERN CREATION MACHINE AND METHOD

(71) Applicant: Gary Shuster, Fresno, CA (US)

(72) Inventor: Gary Shuster, Fresno, CA (US)

(73) Assignee: Gary Shuster, Fresno, CA (US)

(*) Notice: Subject to any disclaimer, the term of this patent is extended or adjusted under 35 U.S.C. 154(b) by 483 days.

(21) Appl. No.: 13/736,940

(22) Filed: Jan. 8, 2013

(65) Prior Publication Data

US 2013/0177216 A1     Jul. 11, 2013

Related U.S. Application Data

(60) Provisional application No. 61/584,305, filed on Jan. 8, 2012, provisional application No. 61/584,308, filed on Jan. 8, 2012.

(51) Int. Cl.
*G06K 9/00*     (2006.01)
*H04N 5/225*     (2006.01)
*G06K 9/62*     (2006.01)
*G06T 11/60*     (2006.01)

(52) U.S. Cl.
CPC .................. *H04N 5/225* (2013.01); *G06K 9/62* (2013.01); *G06T 11/60* (2013.01)

(58) Field of Classification Search
CPC .................................. G06K 9/62; G06T 11/60
USPC .......................................................... 382/181
See application file for complete search history.

(56) References Cited

U.S. PATENT DOCUMENTS

2005/0172382 A1*   8/2005   Masterson ......................... 2/400
2012/0324619 A1*   12/2012   Drago ................................ 2/93

* cited by examiner

*Primary Examiner* — Mike Rahmjoo
(74) *Attorney, Agent, or Firm* — Coleman & Horowitt, LLP; Sherrie M. Flynn

(57) ABSTRACT

Body art, such as tattoos, are integrated or extended onto clothing. Clothing patterns may be integrated or extended onto body art, such as temporary tattoos. In one embodiment, a computer analyzes an image of a body with a tattoo and generates an image suitable for application to clothing. When applied to clothing, the image displays the portion of the tattoo that is covered by the clothing, or may extend the appearance of the tattoo from the skin to the adjacent clothing.

19 Claims, 6 Drawing Sheets

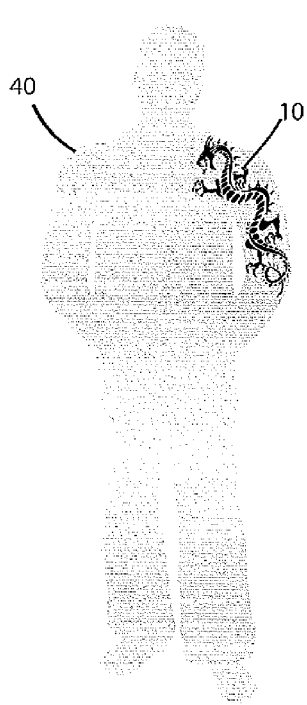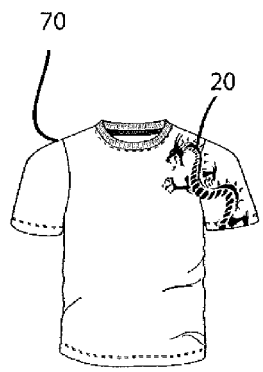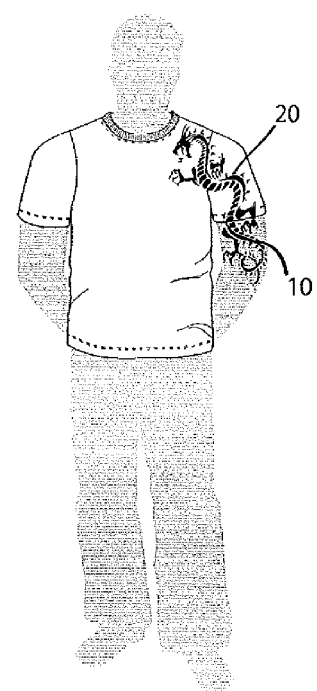
Fig. 1A
Fig. 1B
Fig. 1C

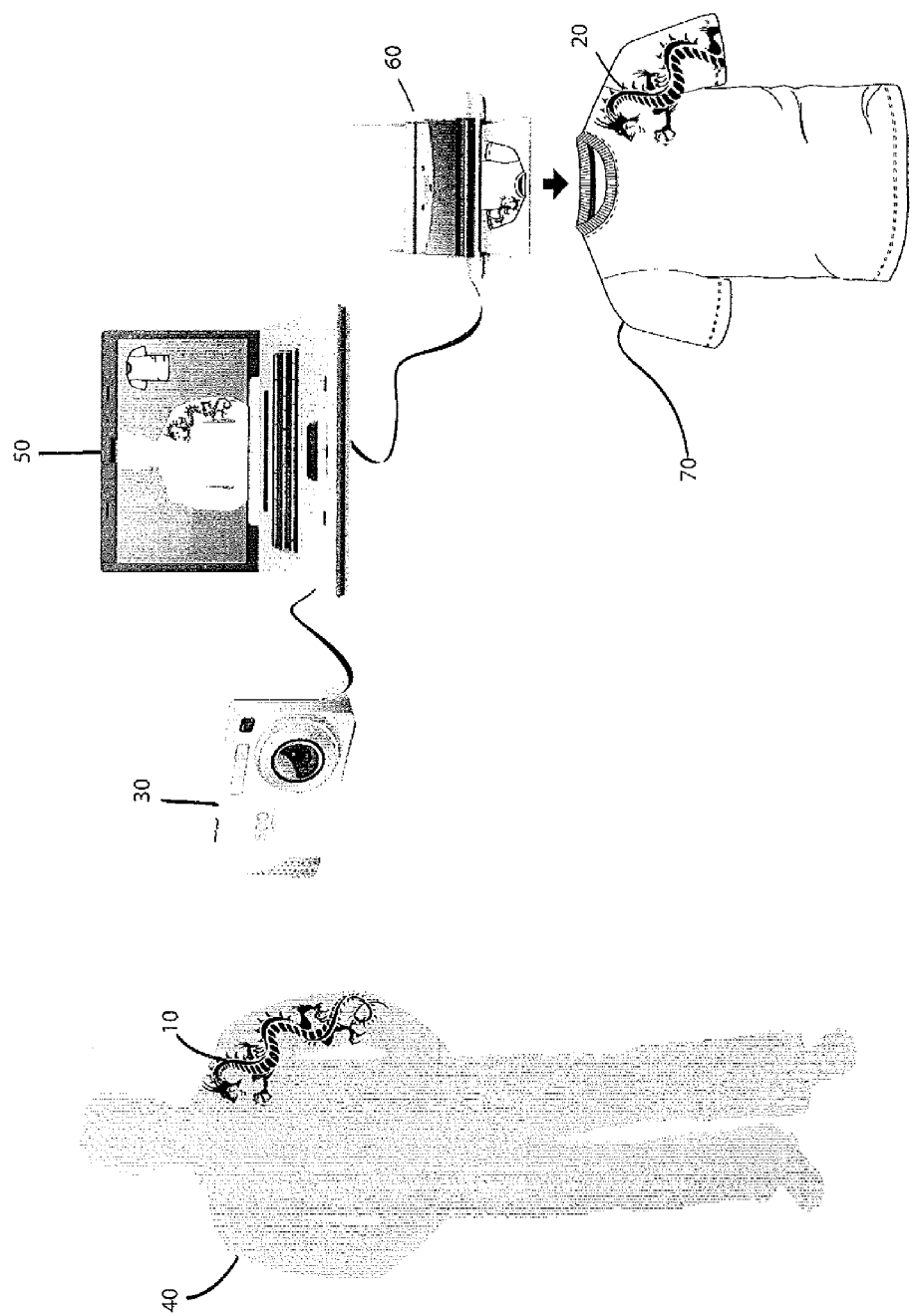

CLOTHING AND BODY COVERING PATTERN CREATION MACHINE AND METHOD

CROSS-REFERENCE TO RELATED APPLICATIONS

This application claims the benefit of U.S. Provisional Patent Application Ser. No. 61/584,305, filed Jan. 8, 2012, which is titled "CLOTHING AND BODY COVERING PATTERN CREATION MACHINE AND METHOD," U.S. Provisional Patent Application Ser. No. 61/584,308, filed Jan. 8, 2012, which is titled "DIGITAL MEDIA ENHANCEMENT SYSTEM, METHOD, AND APPARATUS," and their entire contents of which are incorporated herein by reference.

TECHNICAL FIELD

The present disclosure relates to creation of desirable designs on clothing, such as those placed on clothing by direct-to-cloth printing and applications.

BACKGROUND

Clothing has long been used as a template for self-expression. It is common for people to choose clothing that highlights their personality. Clothing is also chosen for its pleasant appearance. In each of these instances, clothing is not evaluated in a vacuum, but rather is evaluated in the context of the environment it will be seen in. Clothing worn to an office, for example, is chosen with sensitivity to the impression it will made in that environment. Similarly, clothing worn to a nightclub is chosen based in part on its likelihood to create the desired appearance in that setting.

The context used to evaluate clothing is not only where it will be worn, but its ability to enhance or complement the wearer's other clothing and appearance. To this end, it is common for people to select clothing that tends to hang well on their body, appear "slimming", distract from undesirable body attributes, and enhance other attributes. The selection of color or patterns on clothing with the goal of "bringing out the color of your eyes" or complementing skin tone is common. Another factor often used in choosing clothing is consideration of whether it "covers up" scars or other skin attributes.

Body art has existed in some forms from prehistoric times, and now includes many variants, including permanent tattoos, temporary tattoos, piercings, scars (intentionally inflicted or otherwise), makeup (temporary or permanent), surgical alterations and other body alterations. The presence of body art is often something that is covered up using clothing. It is also known to showcase body art by selecting clothing that intentionally exposes the body art (such as a shirt that is cut high to expose a stomach tattoo).

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

In accordance with one or more embodiments and corresponding disclosure, various non-limiting aspects are described in connection with generating tattoo-related images. In one such aspect, a method is provided, which includes employing a processor to execute computer executable instructions stored on a computer readable storage medium to implement the following acts. The acts include obtaining data regarding a tattoo, which includes image data associated with a depiction of the tattoo, and location data associated with a location of the tattoo on a body. The acts further include determining a context associated with the tattoo, generating an extension image based on the context. For this particular embodiment, the context is determined according to at least one of the image data or the location data, and the extension image provides a logical extension to an image of the tattoo.

In another aspect, a computer-readable medium is provided, which is configured to hold encoded instructions, that when executed by a processor, cause a computer to perform various actions. For this particular embodiment, the encoded instructions cause the computer to obtain an image of at least a portion of a body displaying a tattoo and information specifying an article of clothing. The encoded instructions further cause the computer to determine a normally covered portion of the tattoo that is positioned on the body so as to be covered by the article of clothing when worn on the body. The encoded instructions also include instructions for causing the computer to generate an image representing the normally covered portion for fixing to the article of clothing.

In a further aspect, another method is provided, which includes obtaining, in a computer memory, an image of at least a portion of a body displaying a tattoo and information specifying an article of clothing. For this embodiment, the method further includes determining a normally covered portion of the tattoo that is positioned on the body so as to be covered by the article of clothing when worn on the body, and generating an image representing the normally covered portion for fixing to the article of clothing.

Other embodiments and various non-limiting examples, scenarios and implementations are described in more detail below.

BRIEF DESCRIPTION OF THE DRAWINGS

FIG. 1A is an illustration of a person with body art.

FIG. 1B is an illustration of a shirt incorporating elements of the body art.

FIG. 1C is an illustration of a person with body art wearing a shirt that matches the person's body art.

FIG. 2A is an illustration of a person with body art being imaged by a camera connected to a computer and a printer, which together have printed a shirt bearing artwork that incorporates elements of the body art.

DETAILED DESCRIPTION

Figure 3:
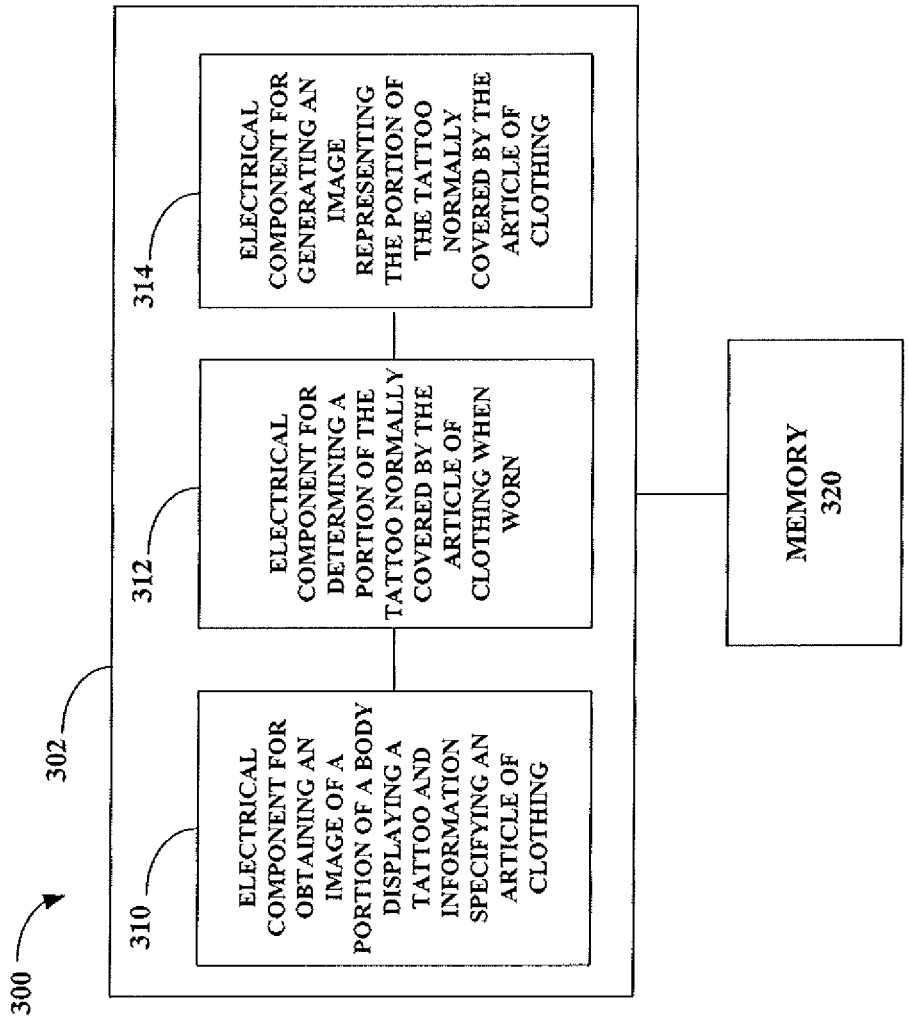
FIG. 3 illustrates an exemplary coupling of electrical components that effectuate generating tattoo-related images according to a first embodiment.

People with body art often find themselves in situations where the body art must be, or should be, covered up. For example, a lawyer with extensive tattoos may learn that judges find the tattoos disruptive to courtroom decorum. It is common for people who anticipate frequently needing to cover up their body art to elect body art that is located only on parts of the body that may be concealed. Actors, doctors, lawyers, judges, pilots, and others may enjoy the secret knowledge that they are wearing concealed body art, but may also wish to showcase that body art even while on the job.

Public decorum rules present a different problem for those who have body art that they wish to display but cannot because of requirements that clothing be worn. Most restaurants, clubs, and other public facilities require a minimum amount of clothing be worn, often including a shirt and pants. Legal restrictions on nudity may also prevent the display of body art that is proximate to certain body parts. For example, a woman with a large dragon tattoo extending from her neck, down her chest, and terminating at her stomach may be forced to cover up a portion of the tattoo, such as that located on her breasts.

Those with body art often desire that their body art be more noticeable but cannot or do not get additional or brighter body art for various reasons. Similarly, those contemplating a large amount of body art (such as a scene that extends from the wrist, up the arm, to the neck) may get the body art applied in stages, in order to determine whether the art should be extended to the next stage (for example, wrist to elbow might be followed by an evaluation period before extending from elbow to shoulder). Additionally, while body art is an attractive idea for many people because of its permanence, there is often a paradoxical desire to have body art that is at once permanent but customizable for different occasions and environments.

Those with body art also often desire to place the most controversial or personal portions of the art in locations where the exposure of that art is more easily controlled. For example, body art that contains a term or image not appropriate for children might be drawn across the buttocks, where it may easily be concealed. The same art placed across the forehead, for example, may be nearly impossible to conceal in many situations. To the extent that a single piece of artwork contains aspects that the person prefers to be concealable and aspects that the person prefers not normally be concealed, it is common for the person to have the art drawn across the body in a manner that leaves the more "private" part in a place where clothing is normally worn (such as the upper arm) and the more "public" part in a place where clothing is not normally worn (such as the lower arm). Because concealing a portion of a single art piece prevents the full impact of the art from being seen, it may be desirable to have a method to display the "private" art in a manner that still conceals or obscures the aspects of that art that the person believes inappropriate for general display in certain settings.

The present application therefore discloses methods and apparatus to modify the appearance of body art, permit body art to be hidden, enhanced, or exposed in certain environments, and to otherwise enhance the control available over the display, perception, and appearance of body art. The disclosed embodiments fulfill these needs and provide further related advantages through various systems, methods, and apparatus for detecting and imaging body art (such as tattoos or piercings) and generating patterned clothing that enhances, alters, conceals, extends, or otherwise changes the appearance, visibility or perception of the body art.

In an aspect, a camera may be used to obtain images of the person with the body art (sometimes called the "subject"). The images are provided to a computer with software configured to identify body art. The software may identify body elements present in the images (i.e. head, arm, leg) and portions of the body that contain body art. This determination may be done with human assistance (as may be necessary, for example, in identifying the location of a tattoo if the photograph shows only a close-up of the tattoo) or in a fully automated manner. The body art may be isolated and analyzed. The colors are corrected for the factors known in the art of photography, such as white balance, but are also corrected for age of the tattoo (using statistically predicted color changes in tattoo ink over time) and skin tone (for example, light green will appear a different color on very light skin than on very dark skin). The user may desire to not engage in some or all aspects of color correction so that the images of the tattoo will more accurately reflect the actual tattoo appearance against the skin. The color and appearance of the tattoo may be further refined by utilizing at least one additional image of the subject with the tattoo from an earlier period. In an aspect, a database of tattoo images may be searched and the tattoo may be either found in the database or, optionally, the closest matching tattoo may be identified (hereafter sometimes the "Matching Reference Artwork"). Either of these additional implementation methods may be used to further refine the image of the subject's tattoo, for example by identifying portions of the image that are an unrelated skin or hair artifact. Color correction may also be implemented during the printing process in light of the ink and fabric used to print.

For tattoos that extend beneath the clothing the user intends to wear, the tattoo art may be reprinted on top of the clothing, so that the existing tattoo visually flows onto the clothing. Regardless of whether the tattoo extends beneath the clothing, the tattoo pattern may be extended, duplicated, or used as the basis for color or patterns that are printed on the clothing. For example, a tattoo of a rose on a woman's forearm may be partially covered by a blouse, but an image of the covered portion of the tattoo may be printed or otherwise placed on the blouse to match the image below the blouse. In the alternative, or in addition, print multiple copies or variants the entire rose tattoo may be placed in other areas on the blouse.

A more complete understanding of these clothing and body covering pattern creation method and apparatus will be afforded to those skilled in the art, as well as a realization of additional advantages and objects thereof, by a considering of the following detailed description of various embodiments. Reference will be made to the appended sheets of drawings which will first be described briefly.

It may be desirable, therefore, to provide a clothing and body covering creation method and apparatus that provides features not provided in the prior art. This disclosure relates to improvements to the state of the art for clothing, temporary, and permanent tattoo and body art enhancement. Among other things, these improvements solve a primary problem within the field, improving the ability to enhance artwork and modify the perceived appearance of otherwise permanently affixed body art.

A system, method, and apparatus are disclosed herein for detecting and imaging body art 10 (such as tattoos or piercings) and generating patterns 20 on clothing 70 that enhances, alters, conceals, extends, or otherwise changes the appearance, visibility or perception of the body art. In an aspect, body art may be extended onto clothing that is worn adjacent to the body art, as is demonstrated in FIG. 1C, elements 20 and 10.

A camera 30 may be used to obtain images of the person, or subject 40 with the body art 10. The images are provided to a computer 50 with software configured to identify body art. The software may identify body elements present in the images (i.e. head, arm, leg) and portions of the body that contain body art. This determination may be done with human assistance (as may be necessary, for example, in identifying the location of a tattoo if the photograph shows only a close-up of the tattoo) or in a fully automated manner. The body art may be isolated, identified, or analyzed. In an aspect, the location of the body art may be correlated with the types of clothing typically worn adjacent to, or on top of, the body art.

The colors may be corrected for one or more the factors known in the art of photography, such as white balance, but may also be corrected for age of the tattoo (using statistically predicted color changes in tattoo ink over time) and skin tone (for example, light green will appear a different color on very light skin than on very dark skin). The user may desire to not engage in some or all aspects of color correction so that the images of the tattoo will more accurately reflect the actual tattoo appearance against the skin. Color and appearance of the tattoo may be further refined by utilizing at least one additional image of the subject with the tattoo from an earlier period. The changes in color over the time between the two photographs may be used to extrapolate the color of the tattoo (or elements thereof) at the time the tattoo was applied, at any time prior to the present, or the likely future tattoo coloration. In the alternative, or in addition, a database of tattoo images may be searched and the tattoo may be either found in the database or, optionally, the closest matching tattoo may be identified (hereafter sometimes the "Matching Reference Artwork"). Either of these additional implementation methods may be used to further refine the image of the subject's tattoo, for example by identifying portions of the image that are an unrelated skin or hair artifact. Color correction may also be implemented during the printing process in light of the ink and fabric used to print. Color correction should also account for the impact of skin tone on the tattoo and fabric color and properties on the printed image. For example, a person with significant yellow skin tones may need the amount of yellow in the tattoo increased for printing on a white shirt.

For tattoos that extend beneath the clothing the user intends to wear, the tattoo art may be reprinted on top of the clothing, so that the existing tattoo visually flows onto the clothing. In an aspect, the tattoo art reprinted on top of the clothing may be extended around the edge of the fabric, and optionally a short distance onto the back of the fabric, so that the natural fabric color does not appear between the tattoo 10 and the pattern on the clothing 20 even if the clothing edge slightly folds up, or when viewed at an angle that includes a view of the edge of the fabric.

Regardless of whether the tattoo extends on the body beneath the clothing, the tattoo pattern may be extended, duplicated, or used as the basis for color or patterns that are printed on the clothing. For example, a tattoo of a rose on a woman's forearm may be partially covered by a blouse, and the covered portion of the tattoo on the blouse to match the image below the blouse may be printed on the blouse aligned with the covered tattoo portion so as to be registered to and overlay the covered part of the tattoo. In the alternative, or in addition, a printing device may be used to print multiple copies or variants of the rose in other areas on the blouse.

The image of the tattoo (or other body art) may be then juxtaposed against a selected piece of clothing as the clothing will be worn on the body. For example, a tattoo extending from the mid-arm to the shoulder 10 may be imaged. A shirt 70 may be then selected, and the portion of the tattoo that may normally be concealed under the t-shirt may be then reproduced on the t-shirt 20. In an aspect, the color of the tattoo may be matched to the color as it will appear on the t-shirt.

Simply using the tattoo alone to generate the artwork for printing on the fabric (or onto a substrate capable of transferring the image to fabric) may result, in some instances, in undesirably low resolution or artifact-prone results. The tattoo image, the Matching Reference Artwork, or both may be utilized to initiate a search for additional artwork that enhances the image, enlarges the image, or otherwise works in a complementary manner with the image. Such a search may be conducted by searching for larger tattoos or images that contain an image similar to, or substantially identical to, the tattoo.

In an aspect, the search may be conducted using a computer 50. There are many photographs, internet resources, and books showcasing tattoo art. Elements of a larger tattoo often appear within, or as the whole of, other tattoos. Using a tattoo of a rose as an example, a search may be implemented for a tattoo with a similar or identical rose within it. The search may be limited by additional parameters, such as "extend the existing tattoo by five inches up the arm", so that images that are matched will have the necessary data to generate the desired additional image components. Computerized or human review of the tattoo image may be used to identify artifacts or defects, such as those caused by scarring or skin blemishes. Such artifacts or defects may be corrected prior to printing.

Additionally, the search and correction functions may be accomplished or enhanced utilizing methods or apparatus disclosed in the concurrently filed U.S. Provisional Patent Application Ser. No. 61/584,308, which is titled "DIGITAL MEDIA ENHANCEMENT SYSTEM, METHOD, AND APPARATUS".

When utilizing one or more additional images for the purposes of enhancing the tattoo image for printing, a copyright status of the additional image may be determined. If a copyright license is necessary, an automated mechanism may be utilized to obtain a license. In one implementation, the reference database contains copyright data and license pricing and purchase data.

In a fully automated implementation, the image that best matches the size, contour, tone, color, and other parameters may be selected. In an aspect, a plurality of choices may be presented to the subject.

In another implementation, the existing artwork, optionally together with any enhanced or additional artwork, may be reproduced elsewhere on the clothing article. In another implementation, a computing system may be used to generate the artwork and instructions as to the clothing article and location on which clothing article where the artwork should be affixed. Said instructions may be implemented by the same or a different computer, or by a person follow said instructions. The artwork may be printed using the same or a different computer.

Once the subject identifies a desired image enhancement, the additional art elements are sent to a printer and the image rendered onto the clothing. In the example above, the user may have elected to extend their rose tattoo with a set of images of flowing rose pedals that moves all the way up the arm to the neck. The data sent to the printer begins with the portion of the tattoo that will normally be under the shirt sleeve, and continues up to the neck.

In an aspect, a tattoo that exists under clothing may be simply reproduced on the clothing. Thus, for example, a tattoo of a bird that a woman has across her breast may be reproduced on the t-shirt over her breast. Where elements of the tattoo are undesirable for use in a setting that the clothing is being produced for, elements of the cover image may be modified or replaced. For example, a subject with back tattoo of a topless woman may have the tattoo art reproduced on the back of his shirt, but with the breasts blurred or covered with a bikini.

In another aspect, the concealed artwork may be reproduced at a different place and/or in a different size and/or in a different color than in the original tattoo. For example, an attorney with a tattoo of a tiger in the small of his back may instead have the tattoo shrunken and reproduced on his tie.

Generally, it may be advantageous to obtain multiple images of the body art. Such images may be captured in different lighting conditions and at different times. At least two such images may be used in combination to identify or reproduce the body art. In one implementation, multiple images taken at different times may be used to eliminate or isolate noise or skin artifacts that are not part of the art, such as bug bites, since such noise or artifacts will appear in less than all of the images.

In another implementation, actual skin or body characteristics may be utilized in place of body art in implementing the referenced embodiments described herein. Actual skin or body characteristics may also be used in combination with body art. For example, a person with an unusual birth mark or scar on their arm may choose to treat that birth mark or scar as body art, generating clothing that continues the image of the scar or birth mark onto the clothing at the point where the clothing will normally cover the mark. Similarly, the illusion of clothing that is more sheer than it actually is may be created by reproduced in a slight, faded manner the body elements underlying the clothing. For example, a thick white shirt with a very light print of a man's chest hair and nipples may be used to create the illusion that the white shirt is less than fully opaque.

Markings or contours of undergarments may also be treated in a similar manner to body art in implementations as described herein. In addition, markings or contours of undergarments that are not actually being worn may be used to create the illusion that undergarments are being worn. For example, a person who desires not to wear a bra may be imaged wearing a bra, have the contour lines or patterns of the bra transferred to a shirt as described herein, and then later wear the shirt without a bra. In such a situation, the markings on the shirt may provide visual cues that bra straps and contours exist, indicating that a bra is in fact being worn. A similar mechanism may be used with other undergarments, such as undershirts or underpants.

An image of a tattoo on a first person may be processed, duplicated, or a combination thereof. The resulting artwork may then be transferred to clothing, temporary tattoos, or a combination thereof so that a second person may wear a temporary tattoo, clothing patterns, or a combination thereof largely identical to, similar to, or simply matching or complementing, the tattoo (or a portion thereof) on the first person.

Operations and methods described herein may be done in reverse. For example, body art may be created that is an extension of a pattern or design on the clothing worn adjacent to the location the newly created body art is to be placed. Such an implementation may involve the generation of temporary tattoos, such as ink on a substrate that is transferred to the skin, or absorbable ink such as henna. However, in some implementations, a permanent tattoo may be utilized. In implementing this variation, the clothing may be imaged and used to generate a temporary (or permanent) tattoo using the same techniques used above for imaging a tattoo for use in generating clothing patterns. In this case, color and image correction may be done so that the color of the tattoo on the skin will match that on the clothing. For example, a person with more yellow tones on their skin might need to have the yellow tones in the clothing reduced for transfer to the tattoo.

Processes performed by the machines described herein, or portions thereof, may be coded as machine readable instructions for performance by one or more programmable computers, and recorded on a computer-readable media. The described systems and processes merely exemplify various embodiments of enhanced features for use in a clothing and body covering creation method and apparatus. The present technology is not limited by these examples.

Turning to FIG. 3, illustrated is a system 300 that facilitates teaching generating tattoo-related images according to an embodiment. System 300 and/or instructions for implementing system 300 can reside within a computing device, for example. As depicted, system 300 includes functional blocks that can represent functions implemented by a processor using instructions and/or data from a computer readable storage medium. System 300 includes a logical grouping 302 of electrical components that can act in conjunction. As illustrated, logical grouping 302 can include an electrical component for obtaining an image of a portion of a body displaying a tattoo and information specifying an article of clothing 310. Furthermore, logical grouping 302 can include an electrical component for determining a portion of the tattoo normally covered by the article of clothing when worn 312. Logical grouping 302 can also include an electrical component for generating an image representing the portion of the tattoo normally covered by the article of clothing 314. As illustrated, system 300 can include a memory 320 configured to retain instructions for executing functions associated with electrical components 310, 312, and 314. While shown as being external to memory 320, it should be appreciated that electrical components 310, 312, and 314 can exist within memory 320.

Figure 4:
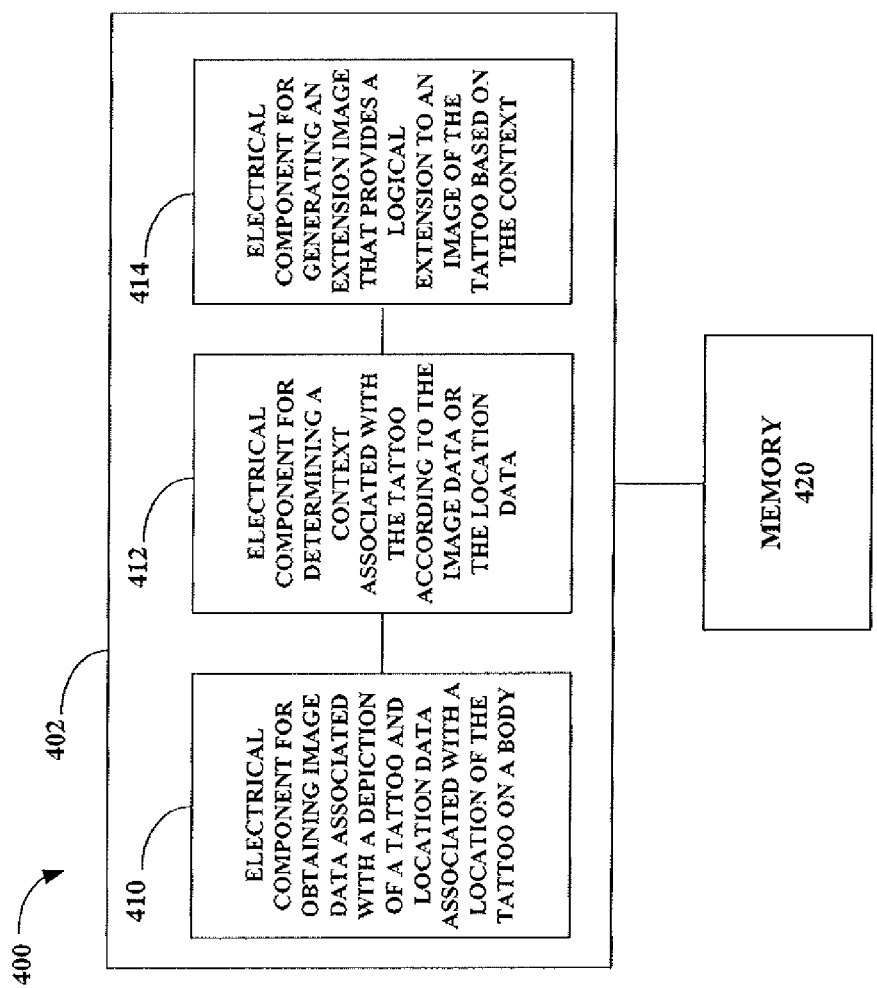
FIG. 4 illustrates an exemplary coupling of electrical components that effectuate generating tattoo-related images according to a second embodiment.

Referring next to FIG. 4, illustrated is another exemplary system 400 that facilitates generating tattoo-related images according to an embodiment. System 400 and/or instructions for implementing system 400 can also physically reside within a computing device, for instance, wherein system 400 includes functional blocks that can represent functions implemented by a processor using instructions and/or data from a computer readable storage medium. System 400 includes a logical grouping 402 of electrical components that can act in conjunction similar to logical grouping 302 in system 300. As illustrated, logical grouping 402 can include an electrical component for obtaining image data associated with a depiction of a tattoo and location data associated with a location of the tattoo on a body 410. Furthermore, logical grouping 402 can include an electrical component for determining a context associated with the tattoo according to the image data or the location data 412. Logical grouping 402 can also include an electrical component for generating an extension image that provides a logical extension to an image of the tattoo based on the context 414. As illustrated, system 400 can include a memory 420 configured to retain instructions for executing functions associated with electrical components 410, 412, and 414. While shown as being external to memory 420, it should again be appreciated that electrical components 410, 412, and 414 can exist within memory 420.

As indicated above, in addition to generating tattoo-related images substantially similar to tattoos normally covered by clothing, generating tattoo-related images which extend tattoos normally exposed when wearing clothing is also contemplated. For instance, a person with a small tattoo of a bird on their hand may wish to wear a long sleeve shirt, wherein an image printed on a sleeve of their shirt appears to be an extension of the tattoo exposed on his/her hand (e.g., a tree branch extending up the person's arm).

To this end, it should be noted that various embodiments for generating tattoo-related images that extend tattoos normally exposed when wearing clothing are disclosed. For instance, with reference to FIG. 4, electrical component 410 may be configured to obtain data regarding a particular tattoo via metadata. Within such embodiment, at least one of the image data or location data is included as metadata. Moreover, it is contemplated that such metadata can be data describing aspects of the tattoo such as text describing the contents of a tattoo and/or a location of the tattoo (e.g., text identifying a particular tattoo as a tattoo of a tiger on a person's chest). If tattoo data is included as metadata, electrical component 412 may then be configured to determine a context of the tattoo at least partially from an analysis of the metadata.

Alternatively, rather than analyzing metadata, generating an extension image may comprise analyzing an actual image of the tattoo. For this particular embodiment, electrical component 410 may be configured to obtain data regarding a particular tattoo via an extrapolation of the image data and/or the location data from a digital photo of the tattoo. For instance, the extrapolating may comprise identifying at least one object in the digital photo via an object recognition program, wherein electrical component 412 is then configured to determine a context of the tattoo at least partially from the at least one object. In an aspect of such embodiment, the extrapolating may comprise identifying the at least one object as a body part on which the tattoo is located (e.g., identifying an arm, if the tattoo is on the person's arm), wherein the location data includes an identification of the body part. In another aspect, however, the extrapolating may comprise identifying the at least one object as an object included in the tattoo image (e.g., identifying a tiger as being part of the tattoo), wherein the image data includes an identification of the object included in the tattoo image.

Since it may be desirable to print extension images on clothing, aspects for scaling such images according to a desired clothing size are also contemplated. For instance, electrical component 410 may be configured to infer an individual's clothing size by analyzing a digital photo of the tattoo. Such analysis may include a comparison of the individual's body parts to reference objects in the digital photo. Once the clothing size is inferred, electrical component 414 may be configured to scale the generated extension image according to the clothing size.

In another aspect, it is contemplated that clandestine images may also be printed on clothing. Namely, it is contemplated that particular fabric and/or ink can be used to print images, wherein viewing such images requires a viewing apparatus configured/calibrated according to a corresponding key. For instance, it is noted that particular fabrics/inks might appear transparent/opaque depending on a particular polarization pattern. It is thus contemplated that clandestine images can be generated according to particular polarization pattern "keys", wherein only individuals with possession of such keys can view the image (e.g., incorporating the key into a smartphone or other mobile device, wherein the clandestine image is then displayed on the device).

Exemplary Networked and Distributed Environments

One of ordinary skill in the art can appreciate that various embodiments for implementing the use of a computing device and related embodiments described herein can be implemented in connection with any computer or other client or server device, which can be deployed as part of a computer network or in a distributed computing environment, and can be connected to any kind of data store. Moreover, one of ordinary skill in the art will appreciate that the embodiments disclosed herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Figure 5:
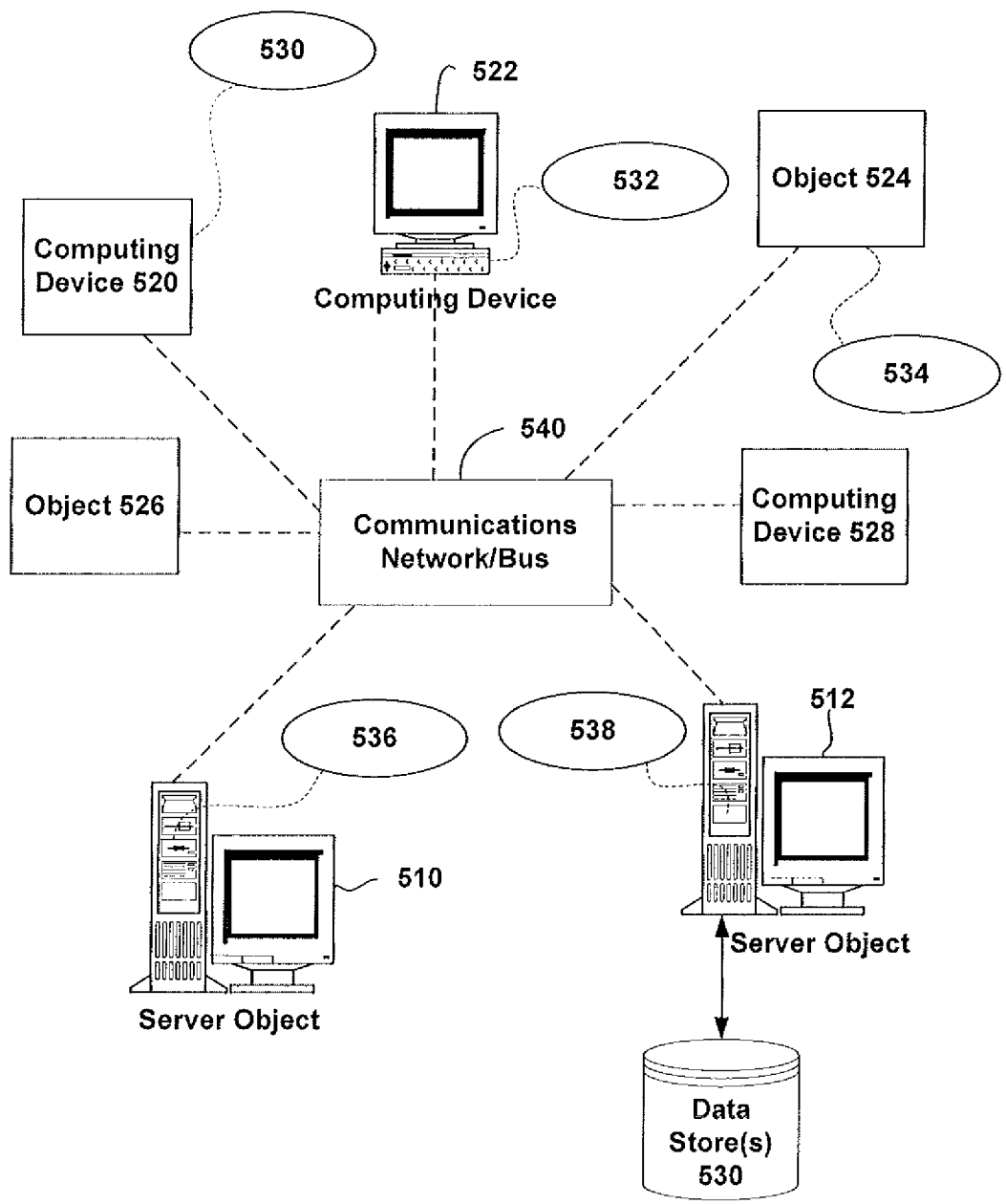
FIG. 5 is a block diagram representing exemplary non-limiting networked environments in which various embodiments described herein can be implemented.

FIG. 5 provides a non-limiting schematic diagram of an exemplary networked or distributed computing environment. The distributed computing environment comprises computing objects or devices 510, 512, etc. and computing objects or devices 520, 522, 524, 526, 528, etc., which may include programs, methods, data stores, programmable logic, etc., as represented by applications 530, 532, 534, 536, 538. It can be appreciated that computing objects or devices 510, 512, etc. and computing objects or devices 520, 522, 524, 526, 528, etc. may comprise different devices, such as PDAs (personal digital assistants), audio/video devices, mobile phones, MP3 players, laptops, etc.

Each computing object or device 510, 512, etc. and computing objects or devices 520, 522, 524, 526, 528, etc. can communicate with one or more other computing objects or devices 510, 512, etc. and computing objects or devices 520, 522, 524, 526, 528, etc. by way of the communications network 540, either directly or indirectly. Even though illustrated as a single element in FIG. 5, network 540 may comprise other computing objects and computing devices that provide services to the system of FIG. 5, and/or may represent multiple interconnected networks, which are not shown. Each computing object or device 510, 512, etc. or 520, 522, 524, 526, 528, etc. can also contain an application, such as applications 530, 532, 534, 536, 538, that might make use of an API (application programming interface), or other object, software, firmware and/or hardware, suitable for communication with or implementation of an infrastructure for information as a service from any platform as provided in accordance with various embodiments.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the techniques as described in various embodiments.

Thus, a host of network topologies and network infrastructures, such as client/server, peer-to-peer, or hybrid architectures, can be utilized. In a client/server architecture, particularly a networked system, a client is usually a computer that accesses shared network resources provided by another computer, e.g., a server. In the illustration of FIG. 5, as a non-limiting example, computing objects or devices 520, 522, 524, 526, 528, etc. can be thought of as clients and computing objects or devices 510, 512, etc. can be thought of as servers where computing objects or devices 510, 512, etc. provide data services, such as receiving data from computing objects or devices 520, 522, 524, 526, 528, etc., storing of data, processing of data, transmitting data to computing objects or devices 520, 522, 524, 526, 528, etc., although any computer can be considered a client, a server, or both, depending on the circumstances. Any of these computing devices may be processing data, or requesting services or tasks that may implicate an infrastructure for information as a service from any platform and related techniques as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the user profiling can be provided standalone, or distributed across multiple computing devices or objects.

In a network environment in which the communications network/bus 540 is the Internet, for example, the computing objects or devices 510, 512, etc. can be Web servers with which the computing objects or devices 520, 522, 524, 526, 528, etc. communicate via any of a number of known protocols, such as HTTP. As mentioned, computing objects or devices 510, 512, etc. may also serve as computing objects or devices 520, 522, 524, 526, 528, etc., or vice versa, as may be characteristic of a distributed computing environment.

Exemplary Computing Device

As mentioned, several of the aforementioned embodiments apply to any device wherein it may be desirable to utilize a computing device to generate tattoo-related images according to the aspects disclosed herein. It is understood, therefore, that handheld, portable and other computing devices and computing objects of all kinds are contemplated for use in connection with the various embodiments described herein, i.e., anywhere that a device may provide some functionality in connection with generating tattoo-related images. Accordingly, the below general purpose remote computer described below in FIG. 6 is but one example, and the embodiments of the subject disclosure may be implemented with any client having network/bus interoperability and interaction.

Although not required, any of the embodiments can partly be implemented via an operating system, for use by a developer of services for a device or object, and/or included within application software that operates in connection with the operable component(s). Software may be described in the general context of computer executable instructions, such as program modules, being executed by one or more computers, such as client workstations, servers or other devices. Those skilled in the art will appreciate that network interactions may be practiced with a variety of computer system configurations and protocols.

Figure 6:
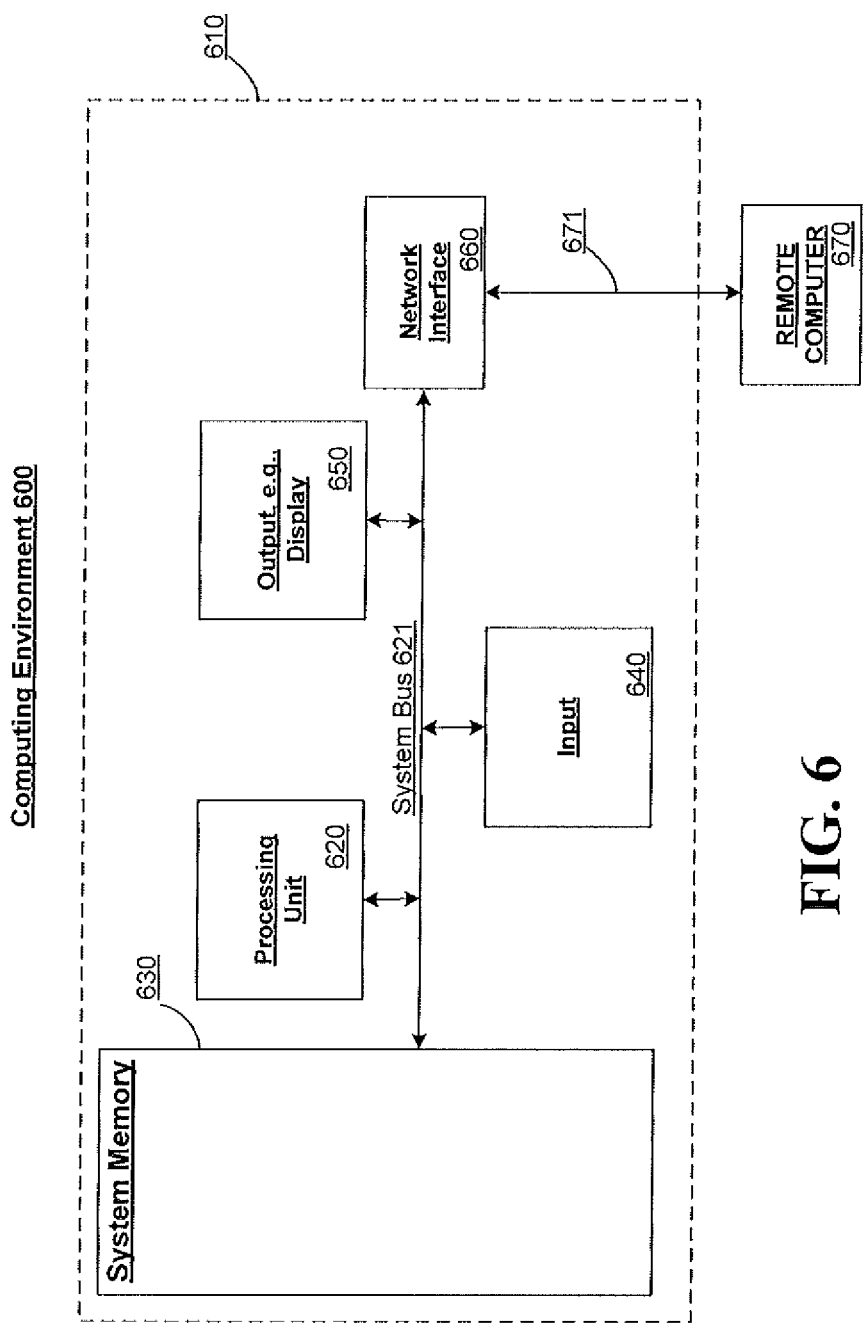
FIG. 6 is a block diagram representing an exemplary non-limiting computing system or operating environment in which one or more aspects of various embodiments described herein can be implemented.

FIG. 6 thus illustrates an example of a suitable computing system environment 600 in which one or more of the embodiments may be implemented, although as made clear above, the computing system environment 600 is only one example of a suitable computing environment and is not intended to suggest any limitation as to the scope of use or functionality of any of the embodiments. The computing environment 600 is not to be interpreted as having any dependency or requirement relating to any one or combination of components illustrated in the exemplary operating environment 600.

With reference to FIG. 6, an exemplary remote device for implementing one or more embodiments herein can include a general purpose computing device in the form of a handheld computer 610. Components of handheld computer 610 may include, but are not limited to, a processing unit 620, a system memory 630, and a system bus 621 that couples various system components including the system memory to the processing unit 620.

Computer 610 typically includes a variety of computer readable media and can be any available media that can be accessed by computer 610. The system memory 630 may include computer storage media in the form of volatile and/or nonvolatile memory such as read only memory (ROM) and/or random access memory (RAM). By way of example, and not limitation, memory 630 may also include an operating system, application programs, other program modules, and program data.

A user may enter commands and information into the computer 610 through input devices 640 A monitor or other type of display device is also connected to the system bus 621 via an interface, such as output interface 650. In addition to a monitor, computers may also include other peripheral output devices such as speakers and a printer, which may be connected through output interface 650.

The computer 610 may operate in a networked or distributed environment using logical connections to one or more other remote computers, such as remote computer 670. The remote computer 670 may be a personal computer, a server, a router, a network PC, a peer device or other common network node, or any other remote media consumption or transmission device, and may include any or all of the elements described above relative to the computer 610. The logical connections depicted in FIG. 6 include a network 671, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and networks, the underlying concepts may be applied to any network system and any computing device or system in which it is desirable to publish, build applications for or consume data in connection with generating tattoo-related images.

There are multiple ways of implementing one or more of the embodiments described herein, e.g., an appropriate API, tool kit, driver code, operating system, control, standalone or downloadable software object, etc. which enables applications and services to use the infrastructure for generating tattoo-related images. Embodiments may be contemplated from the standpoint of an API (or other software object), as well as from a software or hardware object that facilitates generating tattoo-related images in accordance with one or more of the described embodiments. Various implementations and embodiments described herein may have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the disclosed subject matter can be appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

While in some embodiments, a client side perspective is illustrated, it is to be understood for the avoidance of doubt that a corresponding server perspective exists, or vice versa. Similarly, where a method is practiced, a corresponding device can be provided having storage and at least one processor configured to practice that method via one or more components.

What is claimed is:

1. A method comprising:
    obtaining, in a computer memory, an image of at least a portion of a body displaying a tattoo and information specifying an article of clothing;
    determining a normally covered portion of the tattoo that is positioned on the body so as to be covered by the article of clothing when worn on the body;
    generating an image representing the normally covered portion for fixing to the article of clothing, wherein the generating further comprises scaling the extension image according to a clothing size.

2. The method of claim 1, further comprising fixing the image representing the normally covered portion to the article of clothing so that, when the article of clothing is worn, the image generally overlays the normally covered portion of the tattoo and provides a visible representation thereof.

3. The method of claim 1, further comprising printing the image representing the normally covered portion to the article of clothing so that, when the article of clothing is worn, the image generally overlays the normally covered portion of the tattoo and provides a visible representation thereof.

4. The method of claim 1, further comprising fixing the image representing the normally covered portion to a transfer sheet, aligned for fixing to the article of clothing such that when the article of clothing is worn, the image generally overlays the normally covered portion of the tattoo and provides a visible representation thereof.

5. The method of claim 1, further comprising altering the image representing the normally covered portion to remove or obscure a specified detail.

6. The method of claim 1, wherein determining the normally covered portion is performed using the information specifying the article of clothing.

7. The method of claim 1, wherein determining the normally covered portion is performed using the information including measurements of the article of clothing.

8. The method of claim 1, wherein determining the normally covered portion is performed using measurement information for the body.

9. The method of claim 1, wherein determining the normally covered portion is performed in response to user input defining at least a portion of the normally covered portion via a graphical user interface.

10. The method of claim 1, wherein obtaining the image further comprises processing a plurality of images taken at different times.

11. A non-transitory computer readable medium holding encoded instructions, that when executed by a processor, cause a computer to:
    obtain an image of at least a portion of a body displaying a tattoo and information specifying an article of clothing;
    determine a normally covered portion of the tattoo that is positioned on the body so as to be covered by the article of clothing when worn on the body;
    generate an image representing the normally covered portion for fixing to the article of clothing, wherein the image generated is scaled according to a clothing size.

12. The computer-readable medium of claim 11 holding further instructions for fixing the image representing the normally covered portion to the article of clothing so that, when the article of clothing is worn, the image generally overlays the normally covered portion of the tattoo and provides a visible representation thereof.

13. A method, comprising:
    employing a processor to execute computer executable instructions stored on a computer readable storage medium to implement the following acts:
        obtaining data regarding a tattoo, wherein the data includes image data associated with a depiction of the tattoo, and wherein the data further includes location data associated with a location of the tattoo on a body;
        determining a context associated with the tattoo, the context determined according to at least one of the image data or the location data; and
        generating an extension image based on the context, the extension image providing a logical extension to an image of the tattoo, wherein the generating further comprises scaling the extension image according to a clothing size.

14. The method of claim 13, wherein the obtaining comprises extrapolating at least one of the image data or the location data from a digital illustration of the tattoo.

15. The method of claim 14, wherein the extrapolating comprises identifying at least one object in the digital illustration via an object recognition program, and wherein the determining comprises determining the context at least partially from the at least one object.

16. The method of claim 15, wherein the extrapolating comprises identifying the at least one object as a body part on which the tattoo is located, and wherein the location data includes an identification of the body part.

17. The method of claim 15, wherein the extrapolating comprises identifying the at least one object as an object included in the tattoo image, and wherein the image data includes an identification of the object included in the tattoo image.

18. The method of claim 14, wherein the extrapolating further comprises inferring a clothing size from the digital illustration of the tattoo.

19. The method of claim 13, wherein at least one of the image data or location data is included as metadata, and wherein the determining comprises determining the context at least partially from an analysis of the metadata.

* * * * *